United States Patent [19]
Gopalakrishnan

[11] Patent Number: 5,787,211
[45] Date of Patent: Jul. 28, 1998

[54] OPTICAL MODULATOR FOR CATV SYSTEMS

[75] Inventor: Ganesh K. Gopalakrishnan, Huntingdon Valley, Pa.

[73] Assignee: General Instrument Corporation of Delaware, Chicago, Ill.

[21] Appl. No.: 624,045

[22] Filed: Apr. 3, 1996

[51] Int. Cl.$^6$ .................................................. G02F 1/035
[52] U.S. Cl. ................................ 385/2; 385/3; 385/8
[58] Field of Search ................................ 385/2, 3, 4, 6, 385/8, 14, 22, 26, 31, 40, 45

[56] References Cited

U.S. PATENT DOCUMENTS

| | | | |
|---|---|---|---|
| 4,694,121 | 9/1987 | Mahapatra et al. | 385/14 X |
| 4,695,121 | 9/1987 | Mahapatra et al. | 385/14 X |
| 5,303,079 | 4/1994 | Gnauck | 359/188 |
| 5,339,369 | 8/1994 | Hopfer et al. | 385/2 |
| 5,416,859 | 5/1995 | Burns et al. | 385/3 |
| 5,459,800 | 10/1995 | Enokihara et al. | 385/3 |

FOREIGN PATENT DOCUMENTS 0 669 546 A2  8/1995  European Pat. Off. .

OTHER PUBLICATIONS

Gopalakrishnan et al., "Performance and Modeling of Resonantly Enhanced LiNbO$_3$ Modulators for Low–Loss Analog Fiber–Optic Links," *IEEE Transactions on Microwave Theory and Techniques,* vol. 42, No. 12, Dec. 1994, pp. 2650–2656.

Hansen et al. "2.488 Gb/s Unrepeatered Transmission over 529 km using Remotely Pumped Post–and Pre–Amplifiers, Forward Error Correction, and Dispersion Compensation," *1995 Optical Fiber Communication Conference (OFC '95),* Paper PD25–4, San Diego, CA (Feb. 1995).

Howerton et al., "Resonantly enhanced drive–power reduction in a depolarized source for analog fiber links," *1995 Optical Fiber Communicaton Conference (OFC '95) Technical Digest,* San Diego, CA, pp. 249–250 (Feb. 1995).

Howerton et al., "SBS Suppression Using a Depolarized Source for High Power Fiber Applications," *Journal of Lightwave Technology,* vol. 14, No. 3, Mar. 1996, pp. 417–422.

Izutsu et al., "Tens GHz LiNbO$_3$ Waveguide Band Modulators," *Terminal Digest IOOC 1989,* Jul. 1989, pp. 170–171.

Molter–Orr et al., "20 GHz Optical Waveguide Sampler," *IEEE Journal of Quantum Electronics,* vol. 19, No. 12, Dec. 1983, pp. 1877–1883.

*Primary Examiner*—Phan T. H. Palmer
*Attorney, Agent, or Firm*—Barry R. Lipsitz; Ralph F. Hoppin

[57] ABSTRACT

A resonantly enhanced external electro-optic modulator reduces required drive power. The modulator has a coupling structure that efficiently couples power from a feed line into the resonator and eliminates the need for a terminal impedance. The modulator can be driven by a RF signal that is designed to suppress Stimulated Brillouin Scattering (SBS) in a long haul, high power fiber optic link, such as that used to transmit analog CATV signals. The modulator can also be used to depolarize an optical signal. A ring resonator includes a portion located outside the active area of the modulator in order to provide a space-efficient structure. The ring resonator can include one or more coaxial cable portions that are tuned to provide resonance at one or more frequencies that are matched to the input RF drive signal. A pre-chirping phase modulator and intensity modulator which are driven by a common RF/DC bias signal also provide a space- and power-efficient structure by eliminating the need for a separate DC bias electrode. Compared to other adjustable chirp devices, there is no need to pre-distort both branches of the intensity modulator. An integrated electro-optic device includes a resonantly enhanced modulator, a pre-chirping modulator, and an intensity modulator arranged serially and fabricated in a common substrate.

19 Claims, 4 Drawing Sheets

DISTRIBUTION OF ABSOLUTE VOLTAGE IN A
SHORT-CIRCUITED HALF-WAVE RESONATOR

DISTRIBUTION OF ABSOLUTE CURRENT IN A
SHORT-CIRCUITED HALF-WAVE RESONATOR

DISTRIBUTION OF ABSOLUTE VOLTAGE IN AN
OPEN-CIRCUITED HALF-WAVE RESONATOR

DISTRIBUTION OF ABSOLUTE CURRENT IN AN
OPEN-CIRCUITED HALF-WAVE RESONATOR

OPTICAL MODULATOR FOR CATV SYSTEMS

BACKGROUND OF THE INVENTION

The present invention relates to optical fiber communication systems, and more particularly to an external optical modulator employed in such systems. A novel design for a resonant modulator is disclosed. It can be employed independently to provide linewidth broadening and/or polarization scrambling. In bandpass applications, it can be used as an efficient low drive power modulator. Additionally, it can be included in an integrated device which provides pre-chirping and intensity-modulation of an optical carrier for application in cable television (CATV) systems.

Various communication systems, such as CATV systems, currently distribute information signals via coaxial cable. The replacement of coaxial cable with optical fiber transmission lines in such communications systems has become a high priority. Production single mode fiber can support very large bandwidths and has low attenuation. Accordingly, a fiber optic distribution system or a fiber-coax cable hybrid would provide substantially increased performance at a competitive cost as compared to conventional coaxial cable systems.

In a CATV system, the information that is communicated is contained in a radio-frequency (RF) television signal. The use of a television signal comprising amplitude-modulated vestigial sideband (AM-VSB) subcarriers is preferred in the distribution of cable television signals due to the compatibility of that format with the standards of the National Television Standards Committee (NTSC), and the ability to provide an increased number of channels within a given bandwidth. AM-VSB transmission of television signals requires a carrier to noise ratio (CNR) of at least 40 dB, and preferably 60 dB, to provide clear reception.

External optical modulators used for such fiber optic systems are typically based on a travelling wave design, where the travelling wave electrodes are typically defined on an electro-optic crystal such as the single crystal lithium niobate ($LiNbO_3$). Moreover, the modulator is external to the optical source, such as a laser.

The electrodes receive the modulating RF signal at one end, while a terminal resistance (typically 50 ohms) is provided at the other end. Thus, the electrodes act as transmission lines, and provide an electric field in the electro-optic material. Any variation in electric field will cause a corresponding change in the phase of the optical carrier passing through the electro-optic material.

Additionally, electro-optic modulators are commonly constructed as integrated devices in order to reduce size, power consumption, and cost relative to bulk optic devices. An optical waveguide can be fabricated in an electro-optic crystal such as $LiNbO_3$ by in-diffusing a material such as titanium to increase the refractive index. An electric field can then be applied using transmission line electrodes as discussed. Moreover, since typically the gap "g" between the center electrode and the ground plane of the waveguide is much smaller than the length L, the half-wave voltage $V_\pi$ can be as small as a few volts. $V_\pi$ is an important measure of the power consumption (drive power) of an electro-optic device, and can be expressed by the relationship $V_\pi = g\lambda_o/Lrn^3$, where $\lambda_o$ is the free-space wavelength of the optical source, r is the Pockels coefficient (linear electro-optic coefficient), and n is the refractive index. Thus, $V_\pi$ is inversely proportional to the length L of the device.

Moreover, with the availability of high-power diode-pumped solid-state and distributed feedback (DFB) lasers and Erbium-doped fiber amplifiers, together with the near chirp-free performance of external modulators, CATV signals can be transmitted over long distances. In such fiber optic systems, a coherent light wave is modulated by a radio-frequency (RF) signal which contains audio, video and other information which is to be transmitted. A Mach-Zender interferometer can be used to modulate the intensity (i.e., amplitude) of the optical carrier. The modulated signal is then provided over an optical fiber, with amplifiers spaced periodically as required to maintain an acceptable CNR.

However, as the input optical power into a fiber optic link is increased, a threshold for Stimulated Brillouin Scattering (SBS) may be reached. If the input optical power is greater than this threshold, a significant amount of power can be lost over the optical fiber link due to a back-scattered Stokes wave. At this point, the carrier-to-noise ratio (CNR) of the optical signal also starts to degrade. The threshold for SBS is proportional to the convolution of the laser linewidth with the Brillouin linewidth, where the Brillouin linewidth is a constant that depends on the type of fiber used.

Furthermore, if the linewidth of the laser is broadened beyond the Brillouin linewidth, then the threshold for SBS is increased. Thus, the onset of SBS can be delayed to allow a larger input optical power level by broadening the laser linewidth (i.e., the linewidth of the optical carrier).

In addition to external phase modulation of the optical carrier, SBS suppression may be achieved by directly dithering the laser. Dithering, also known as optical chirp, is defined as a rapid change in the emission wavelength of an optical source such as a laser during direct modulation of the source. When a semiconductor laser diode, for instance, is modulated with a time-varying injected current, chirping occurs. The frequency of the laser output varies as the optical power is modulated due to refractive index changes that accompany time-varying charge-carrier concentrations in the laser cavity. The chirped signal is a harmonic function whose instantaneous frequency (the derivative of the phase) increases and decreases linearly to the first order with time according to a modulation index of the laser. The laser thus produces light at a mode that is dithered between two bounds, thereby broadening the average linewidth of the laser output. The laser thus exhibits both amplitude and frequency modulation as the injected current is varied.

Additionally, intensity modulators, such as the Mach-Zender modulator, can exhibit residual chirping (i.e., self-chirping). This phenomenon, caused by asymmetric field overlap between the two arms of the Mach-Zender structure, can contribute to phase modulation of a transmitted optical carrier.

Moreover, SBS suppression may be achieved in an external modulator by phase-modulating the optical carrier with an out-of-band tone. For example, a 2 GHz sinusoidal wave may be employed with a typical 77-channel CATV system, where the bandwidth is approximately 50 to 550 MHz. Currently, the combination of laser dithering and external phase modulation is employed to suppress SBS. This is due to prohibitively large drive powers in external phase modulators that render laser dithering necessary. Large drive powers can also cause thermal instability.

Furthermore, polarization scramblers have application in optical fiber communication links, as discussed in M. M. Howerton et al., "SBS Suppression Using a Depolarized Source for High Power Fiber Applications," *Journal of Lightwave Technology*, Vol. 14, No. 3, pp. 417–422, March 1996, incorporated herein by reference. An optical phase modulator can provide both SBS suppression and depolarization when driven, for example, by a single or multi-tone RF signal. For instance, P. B. Hansen et al. discusses suppressing SBS using a phase modulator driven by four sinusoids with frequencies in the range from 70 MHz to 3 GHz in the paper entitled "2.488 Gb/s Unrepeatered Transmission over 529 km using Remotely Pumped Post- and Pre-Amplifiers, Forward Error Correction, and Dispersion Compensation," 1995 Optical Fiber Communication Conference (OFC '95), Paper PD25-4, San Diego, Calif. (February 1995).

A typical integrated optical modulator for CATV includes both a phase modulation section for SBS suppression, a Mach-Zender interferometer for intensity-modulation, and a DC bias electrode. The drive power for the individual sections of the device can be decreased by increasing the length of each section. However, practical considerations such as wafer diameter limit the choice of length. Furthermore, longer devices also suffer from a larger electrode loss.

Resonantly enhanced modulators have been employed to reduce drive power. See, for instance, L. A. Molter et al., "20 GHz Optical Waveguide Sampler," *IEEE Journal of Quantum Electronics*, Vol. 19, No. 12, December 1983, p. 1877–83; and M. Izutsu et al., "Tens GHz LiNbO$_3$ Waveguide Band Modulators," *Technical Digest IOOC 1989*, July 1989, pp. 170–71. These approaches use a center-fed half-wave resonator that is shorted at both ends. Resonant enhancement has also been reported in a travelling wave modulator by appropriate choice of termination and length of the non-active section. See G. K. Gopalakrishnan et al., "Performance and Modeling of Resonantly Enhanced LiNbO$_3$ Modulators for Low-Loss Analog Fiber-Optic Links," *IEEE Transactions on Microwave Theory and Techniques*, Vol. 42, No. 12, December 1994, pp. 2650–56, incorporated herein by reference.

Planar transmission line based resonators are classified as either linear resonators or ring resonators. The linear resonator is a half-wave resonator that is either open or short-circuited at both ends. L. A. Molter et al. and M. Izutsu et al., mentioned above, employed a short-circuited design. In contrast, the ring resonator is a full-wave resonator that is formed by closing the transmission line on itself.

Moreover, an appropriate coupling structure must be provided for the resonant modulator. However, the design of coupling structures for resonantly enhanced optical modulators is an important issue that has not received a great deal of attention. The coupling structure must efficiently transfer power from the feed line to the resonator. At the same time, the resonator's intrinsic field configuration should be minimally perturbed. That is, if there is a voltage maximum in the resonator, the coupling structure should not alter the location of this maximum. The same constraint holds for a voltage minimum, a current maximum, and a current minimum.

Accordingly, it would be advantageous to have a resonantly enhanced modulator that reduces required drive power. The modulator should have a corresponding coupling structure that efficiently couples power from a feed line into the resonator, and should be able to provide SBS suppression and/or depolarization in an optical fiber communication link. It would also be advantageous to provide the modulator in an integrated structure which further modulates the optical carrier with an information-carrying RF signal such as a CATV signal. The integrated structure should provide further power consumption and space efficiencies by eliminating the DC bias electrode while providing pre-chirping of the optical carrier. The present invention provides the above and other advantages.

SUMMARY OF THE INVENTION

In accordance with the present invention, a resonantly enhanced external electro-optic modulator is presented. The modulator is particularly adapted for use in long distance, high power fiber optic CATV links. The modulator includes a first electrode and an RF coupling electrode for coupling a radio-frequency (RF) signal to the first electrode. A ground electrode operatively associated with the first electrode provides an electromagnetic field corresponding to the RF signal to an optical signal in a waveguide of the modulator. The optical signal is coherent radiation from a laser, and is modulated by the electromagnetic field according to well-known principles of electro-optics. A ring resonator which is capacitively or inductively coupled to the RF coupling electrode resonates in response to the electromagnetic field. Thus, the terminal impedance commonly used in travelling wave type modulators is not required, and a significant savings in drive current results.

Furthermore, the RF signal can be selected to broaden a linewidth of the optical signal to suppress Stimulated Brillouin Scattering (SBS) in an optical fiber over which the optical signal is transmitted. A single tone or multiple tones can be used. The RF can also be selected to depolarize the optical signal.

Advantageously, the ring resonator can comprise a portion such as a coaxial cable which is located outside the active area of the modulator. The coaxial cable includes a central conducting portion and an outer ground portion, where the outer ground portion is grounded to a ground plane of the modulator. This configuration is particularly space-efficient. Furthermore, when a plurality of RF tones are input, multiple resonances can be provided by using a plurality of coaxial cables in the resonator ring. The configuration of the ring resonator can be adjusted according to known transmission line and waveguide theory. For example, the length and the microwave index of the ring resonator can be adjusted to tune a resonant frequency thereof.

In a particularly advantageous embodiment, the first electrode of the modulator is split into a first portion and a second portion, and the RF coupling means is a central electrode located between the first and second portions.

Further in accordance with the present invention, an electro-optic intensity modulation apparatus for providing an intensity-modulated optical signal includes a waveguide for providing an optical signal in a first path and a second path. This modulator configuration is found typically in a Mach-Zehnder interferometer. An RF coupling electrode includes a first end and a second end, and has a portion located between the first and second paths. A radio-frequency (RF) intensity-modulation signal and a direct current (DC) bias signal are coupled to the first end of the RF coupling electrode. Accordingly, there is no need for a separate DC bias electrode.

The RF signal contains information to be transmitted by the optical signal over a fiber optic link. For example, in CATV systems, the RF modulation signal is an AM-VSB signal. A first ground electrode operatively associated with the RF coupling electrode provides a first electromagnetic field corresponding to the RF intensity-modulation signal and the (DC) bias signal to modulate the optical signal in the first path.

Alternatively, in a push-pull Mach-Zehnder configuration, a second ground electrode operatively associated with the RF coupling electrode provides a second electromagnetic field corresponding to the RF intensity-modulation signal and the (DC) bias signal to modulate the optical signal in the second path.

A terminal impedance is coupled to the second end of the RF coupling electrode to provide an open circuit to the DC bias signal and a short circuit to the RF intensity-modulation signal.

An electro-optic phase modulator for providing a pre-chirped optical signal for use with the intensity modulation apparatus is also presented. The phase modulator includes an RF electrode and means for coupling the RF intensity-modulation signal to the RF electrode. A ground electrode operatively associated with the RF electrode provides an electromagnetic field corresponding to the RF intensity-modulation signal to an optical signal in a waveguide of the phase modulator. The phase modulator pre-chirps the optical signal in the waveguide of the phase modulator for subsequent input to the waveguide of the intensity modulation apparatus. Pre-chirping is necessary in long haul analog optical fiber links to combat fiber dispersion in connection with self-phase modulation in the fiber.

Finally, in a three-part integrated device, a linewidth-broadening modulator with the ring resonator is serially coupled to the pre-chirping phase modulator and intensity modulator. The linewidth-broadening modulator, pre-chirping phase modulator, and intensity modulator are disposed on a common substrate to optimize power consumption and space efficiency.

DESCRIPTION OF THE PREFERRED EMBODIMENTS

The present invention relates to a resonantly enhanced external electro-optic modulator. The modulator advantageously reduces drive current and is space-efficient. Additionally, in accordance with the present invention, an improved integrated device includes the resonant modulator, a pre-chirping modulator, and an intensity modulator.

Figure 1:
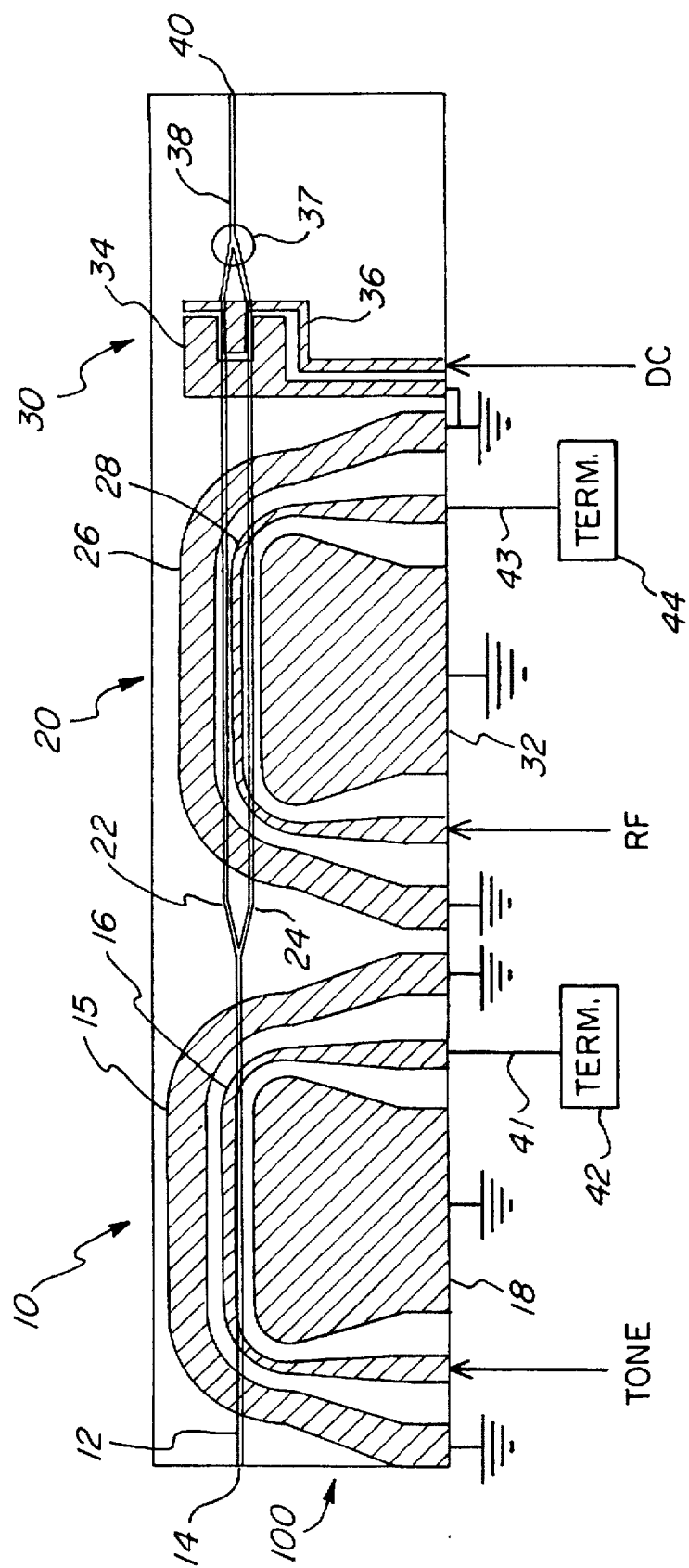
FIG. 1 shows a top view of a conventional CATV optical modulator, including a phase modulator and a Mach-Zehnder intensity modulator.

FIG. 1 shows a conventional CATV optical modulation device 100, including a phase modulator 10, Mach-Zehnder intensity modulator 20, and DC bias element 30. The device comprises an electro-optic material such as x-cut or z-cut lithium niobate (LiNbO$_3$) with a waveguide 12 fabricated in the crystal by in-diffusing a material such as titanium. Coherent radiation such as that from a laser at 1.55 µm (1,550 nm) is coupled to an input end 14 of the waveguide 12. The radiation propagates in the waveguide, passing through the phase modulator 10 and entering the intensity modulator 20, where the radiation is split into two separate paths 22 and 24. After passing through a DC bias section 30, the two optical signals are recombined at coupler 37 and output via path 38 and output port 40 for transmission over an optical fiber link (not shown).

In particular, the phase modulator 10 includes an electrode 16 which receives a RF input at a first end, such as an out-of-band tone designed to suppress SBS in the optical fiber link. A terminal impedance 42 is provided coupled via line 41 to the second end of the electrode 16. The terminal impedance 42, typically 50 ohms, is matched to the electrode 16, which exhibits its own impedance as a transmission line. Ground electrodes 15 and 18 cooperate with electrode 16 to produce an electromagnetic field to exist in the region of the waveguide 12. The optical signal propagating in the waveguide 12 is thus modulated according to the electromagnetic field.

Note that for a z-cut crystal such as LiNbO$_3$, the waveguide 12 is located in a substrate directly beneath the electrode 16, while for an x-cut crystal, the waveguide 12 is offset from the electrode 16.

After being phase modulated, the optical signal in waveguide 12 is split into paths 22 and 24 of the intensity modulator 20. The electrode construction provided in the intensity modulator 20 is similar to that provided in the phase modulator 10. An electrode 28 carries a RF signal as a transmission line. Ground electrode 32 cooperates with electrode 28 to provide an electromagnetic field corresponding to the input RF signal to the optical carrier in the path 24. The RF signal comprises data which is to be transmitted, such as CATV video and audio signals. Likewise, ground electrode 26 cooperates with electrode 28 to provide an electromagnetic field corresponding to the input RF signal to the optical carrier in the path 22. A terminal impedance 44 is coupled via line 43 to the electrode 28.

The optical signal in paths 22 and 24 then propagate through the DC bias element 30. The DC bias element includes electrodes 34 and 36. After passing through the DC bias section 30 of the optical modulation device 100, the optical signals in paths 22 and 24 are recombined at coupler 37 to produce a phase- and intensity-modulated signal at path 38 and output port 40 for transmission.

Generally, it is known that the drive power required for each section 10, 20, 30 of the device 100 can be decreased by increasing the length of the section. However, practical considerations such as wafer diameter limit the choice of length. In addition, large devices suffer from a larger electrode loss. Specifically, with the conventional device of FIG. 1, design considerations such as the overlap between the optical and electrical fields, and the characteristic impedance of the electrodes limit the size of the electrodes in the active section of the phase modulator 10. Hence, the electrode loss in the active section is typically large. Furthermore, since the phase modulator 10 is a one-pass device, current passes once through the electrode 16 and is dissipated in a terminal impedance (i.e., load resistance) 42. This disadvantageously consumes a significant amount of drive current in the modulator.

Figure 2:
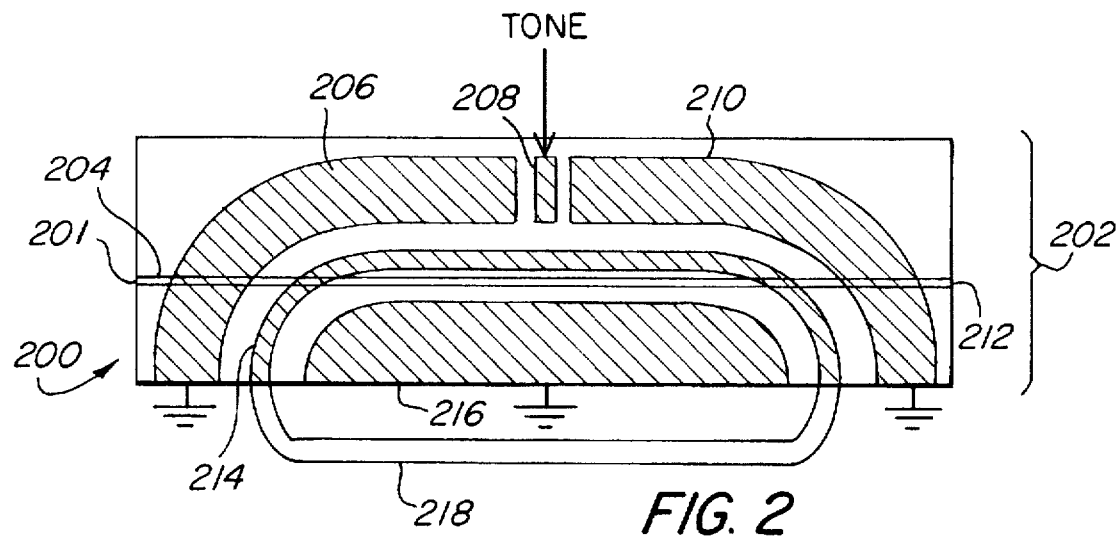
FIG. 2 shows a top view of a resonantly enhanced modulator in accordance with the present invention.

FIG. 2 shows a resonantly enhanced modulator 200 in accordance with the present invention. An optical carrier is input to the device via input port 201 and propagates in the waveguide 204. The modulator includes a ring resonator structure 214 and 218 which significantly reduces required drive current by eliminating the need for a terminal impedance. The modulator 200 is expected to have a direct beneficial impact on analog CATV systems in particular since SBS suppression can be achieved with relative ease. The modulator 200 can also be employed to design bandpass Mach-Zehnder modulators and can be used as a depolarizer.

The modulator 200 includes a first outer ground plane electrode which is split into a first portion 206 and a second portion 210, and a central ground electrode 216. The configuration shown is a co-planar waveguide structure which is appropriate for an x-cut lithium niobate crystal. Note that, in the embodiment shown, the electrode portions 206 and 210 are shaped in a manner such that the waveguide 204 crosses near the electrodes 206 and 210 in an approximately perpendicular manner in order to provide a structure where the optical input and electrical inputs on the lithium niobate chip are physically separated. That is, in the embodiment shown, the optical input is on one side of the chip, while the electrical inputs are on another side. This provides an efficient layout on the chip, where available "real estate" is at a premium.

A RF signal, such as an SBS-suppressing out-of-band tone is provided at a central electrode 208. Electrode 208 is separated from electrodes 206 and 210 to preclude grounding, and provides a small perturbation in the ground plane defined by electrodes 206 and 210. Electrode 214 is capacitively coupled to the RF signal via the central electrode 208. With capacitive coupling, there is a gap between the feed line (e.g., electrode 208) and the resonator portion 214. Moreover, the feed line is located across from a position in the resonator portion 214 which has a voltage maximum. The electrodes 206 and 210 cooperate with electrode 216 to produce an electromagnetic field corresponding to the RF signal in the region of the waveguide 204.

Note that various schemes may be used to couple the RF signal to the resonator. It is not necessary to split the first outer ground plane electrode into two segments, nor is it necessary to provide the electrode 208 centrally when the first outer ground plane electrode is split. Generally, the RF signal may be provided in different positions according to the desired excitation scheme.

In the embodiment shown, the ring resonator includes a portion 214 which is located within the active section 202 of the modulator 200. The active section 202 interacts with the optical wave. The portion 214 may be constructed using standard metallic plating techniques, such as gold plating, which can also be used for electrodes 206, 208, 210 and 216.

Furthermore, a portion 218 of the ring resonator is provided outside the active area 202 of the modulator 200 (e.g., in a non-active area). This portion 218 may advantageously comprise a low-loss coaxial cable which is connected to the portion 214 in the active section 202 to form a resonant cavity. The coaxial cable includes an inner conducting portion which would be coupled to electrode 214, and an outer ground plane portion. However, the portion 218 may be a transmission line other than a coaxial cable. As an alternative to the coaxial cable, a transmission line defined on a low loss substrate comprised, for example, of alumina, may be used to close the resonant loop.

Furthermore, in accordance with the present invention, if the length of the active section 202 is limited by on-chip space concerns, the non-active section 218 of the resonator can be adjusted to obtain resonance at any given frequency without requiring alteration of the active section 202. Also, since the launched power into the modulator 200 is circulated in the active and non-active sections of the resonator rather than dissipated by a terminal impedance, there will be a significant reduction in drive power required to operate the modulator 200. The modulated optical signal will be output at output port 212 of the modulator 200.

Note that while a portion 218 of the ring resonator is shown outside the active area 202, this is not required. The entire resonator may be located within the active area 202 is space permits. Other alternative configurations are also possible. For instance, the resonator portion 218 may be disposed partly within the active area and partly outside the active area, or the resonator portion 218 may be comprised of different transmission line media.

The ring resonator is a full-wave resonator that is formed by closing a transmission line on itself. The resonant frequency $f_\pi$ of the ring resonator is given by $f_\pi = Nc/2\pi r n_m$, where $N=1, 2, 3 \ldots$ is the mode number, c is the velocity of light in free space, $n_m$ is the microwave index of the transmission line that forms the resonator, and r is the mean radius of the ring. If the ring is constrained to two sections with physical lengths $L_1$ and $L_2$ and microwave indexes $n_1$ and $n_2$, respectively, $f_\pi$ is given by $f_\pi = Nc/(L_1 n_1 + L_2 n_2)$. Accordingly, the resonant frequency $f_\pi$ can be adjusted by varying the length or microwave index of either of the two sections.

In comparison, a linear resonator is a half-wave resonator that is either open or short-circuited at both ends. The resonant frequency $f_d$ of the linear resonator is given by $f_d = Nc/2L n_m$, where L is the physical length of the resonator.

The coupling structure of the resonantly enhanced modulator 200 should be designed so there is an efficient transfer of power from the feed-line to the resonator 214, 218. In particular, the resonator's intrinsic field configuration should be minimally perturbed. That is, if there is a voltage maximum in the resonator, the coupling structure should not alter the location of this maximum. The same constraint holds for a voltage minimum, a current maximum, and a current minimum. A voltage minimum or current maximum in the resonator corresponds to a short circuit, while a voltage maximum and current minimum correspond to an open circuit.

Figure 5A:
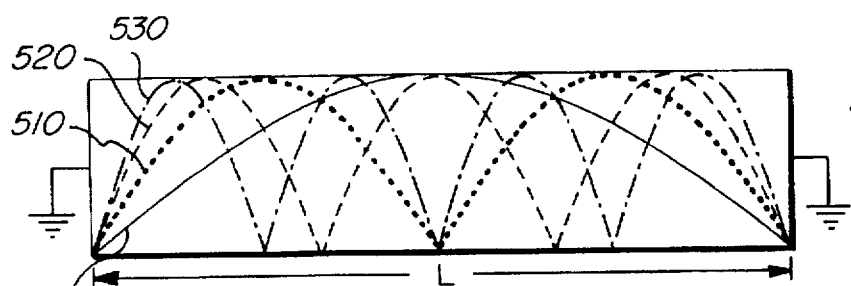
FIG. 5a shows the distribution of absolute voltage in a short-circuited half-wave resonator.
Figure 5B:
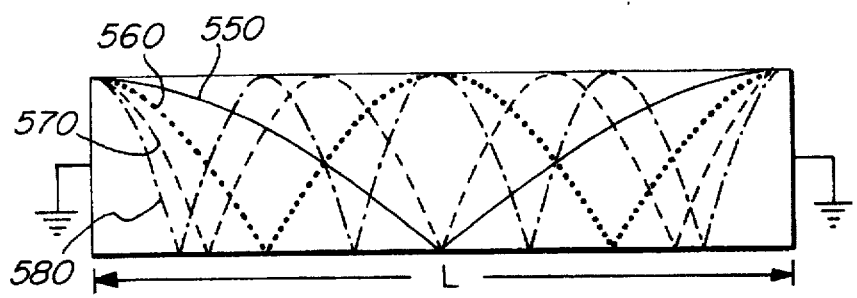
FIG. 5b shows the distribution of absolute current in a short-circuited half-wave resonator.

FIG. 5a shows the distribution of absolute voltage in a short-circuited half-wave resonator for the first four modes (N=1,2,3,4), indicated by reference numerals 500, 510, 520 and 530, respectively. FIG. 5b shows the distribution of absolute current in a short-circuited half-wave resonator with length L for the first four modes (N=1,2,3,4) indicated by reference numerals 550, 560, 570 and 580, respectively. As expected, the voltage distribution of the first mode (line 500) contains nulls at the two shorted ends with a maximum in the middle of the resonator. In contrast, FIG. 5b shows that the current distribution in the short-circuited resonator has a null in the middle with maxima at the two shorted ends (line 550).

A center-fed coupling structure that is attached directly to a short-circuited resonator is said to provide inductive coupling. With inductive coupling, an idle conductor (i.e., the resonator) generates a current due to the magnetic field produced by the current in the coupling structure. Such a structure does not allow for the maintenance of the current minimum condition of the first mode in the middle of the resonator because the transmission line that forms the coupling structure leaks power away from the resonator. Thus, the field configuration of the short-circuited resonator is significantly perturbed and the resonance frequency is altered. Hence, to excite the first mode in a short-circuited half-wave resonator, there must be an open circuit, or a very high impedance transmission line (to simulate an open circuit), between the feed line and the resonator. This is known as capacitive coupling. With capacitive coupling, an idle conductor (i.e., the resonator) generates a voltage due to the electric field produced by the voltage in the coupling structure. Thus, in center-fed short-circuited half-wave resonators, capacitive coupling should be employed to excite the odd modes, while inductive coupling should be used to excite the even modes.

Conversely, if inductive coupling is used to excite the odd modes of the short-circuited half-wave resonator, the impedance of the transmission line that forms the coupling structure will have to be very large to effectively simulate an open circuit at the point of excitation. The inverse is true for capacitive coupling. Thus, the center-fed half-wave resonator can be designed for odd or even mode operation, but not both.

Figure 6A:
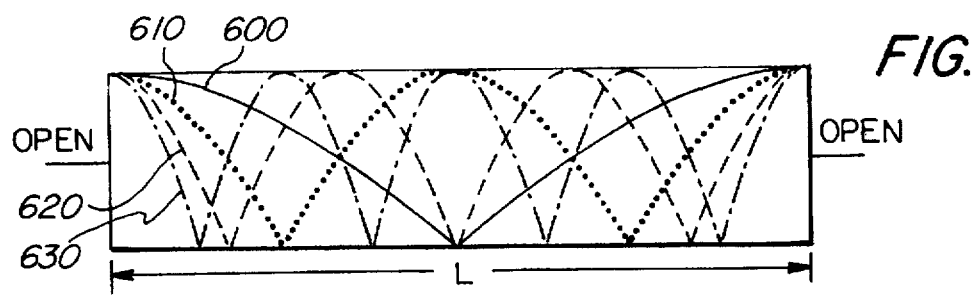
FIG. 6a shows the distribution of absolute voltage in an open-circuited half-wave resonator.
Figure 6B:
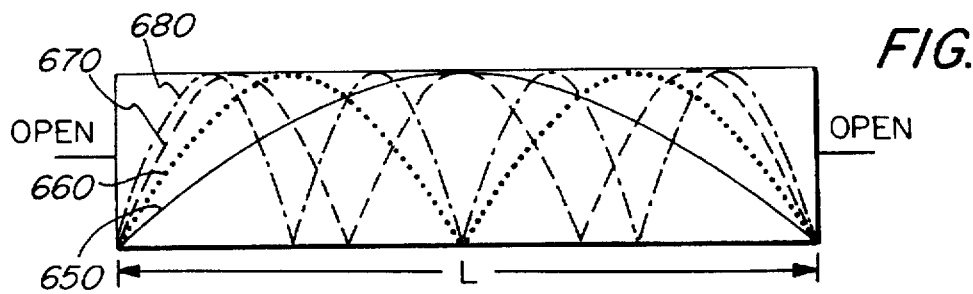
FIG. 6b shows the distribution of absolute current in an open-circuited half-wave resonator.

FIG. 6a shows the distribution of absolute voltage in an open-circuited half-wave resonator, while FIG. 6b shows the distribution of absolute current in an open-circuited half-wave resonator. Based on the above discussion, it can be seen that the odd modes of the structure can be excited by inductive coupling, while the even modes can be excited by capacitive coupling. Alternatively, the location of the RF feed line can be skewed from the center to excite specific modes. For example, referring to FIGS. 5a and 5b, a capacitively coupled feed line located at a distance of one quarter wavelength from one of the ends of the short-circuited resonator may be used to excite the third mode (lines 520 and 570).

In contrast to the half-wave resonators discussed above, ring resonators are full-wave resonators that can support both odd and even modes for a given excitation (coupling) scheme, and are generally capacitively coupled. Accordingly, the ring resonator provides greater design flexibility.

Figure 3:
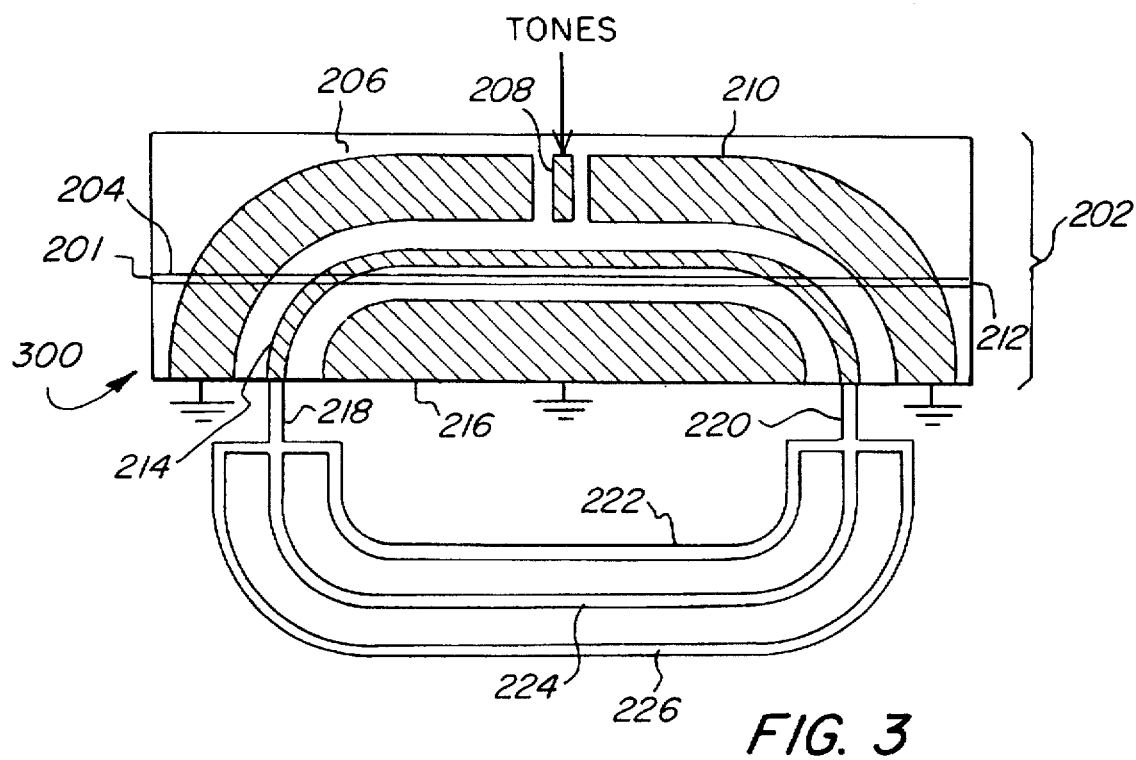
FIG. 3 shows a top view of another embodiment of the resonantly enhanced modulator in accordance with the present invention.

FIG. 3 shows another embodiment of a resonantly enhanced modulator 300 in accordance with the present invention. Elements in FIG. 3 correspond to like-numbered elements in FIG. 2, unless indicated otherwise. In this embodiment, the ring resonator can resonate at three different frequencies. When SBS suppression is desired in a long distance fiber optic link, a plurality of RF tones may be input to electrode 208. The structure of FIG. 3 can be tuned to provide resonance at a corresponding plurality of frequencies.

For example, when three tones are input to terminal 208, a three-mode resonance device can be provided. The resonator includes a portion which is located outside the active area 202 of the modulator. Conductive lines 218 and 220 of the resonator are coupled to the resonance electrode 214, which is in the active area. Three conductive lines (splits) 222, 224, and 226 with varying lengths are coupled to the lines 218 and 220 to allow resonance at three different frequencies. The three resonance frequencies can be arbitrary, and need not be harmonically related. The conducting members 218, 220, 222, 224 and 226 may comprise coaxial cable which advantageously has a low loss and exhibits low coupling between the different non-active sections. Of course, the resonator may be structured to provide resonance at fewer or greater than three frequencies. The number of splits, and the length of each conducting member (e.g., coaxial cable section) is determined by the number of input sinusoids and their respective frequencies. Furthermore, as discussed previously, the resonator may be located fully within the active area if space permits.

Figure 4:
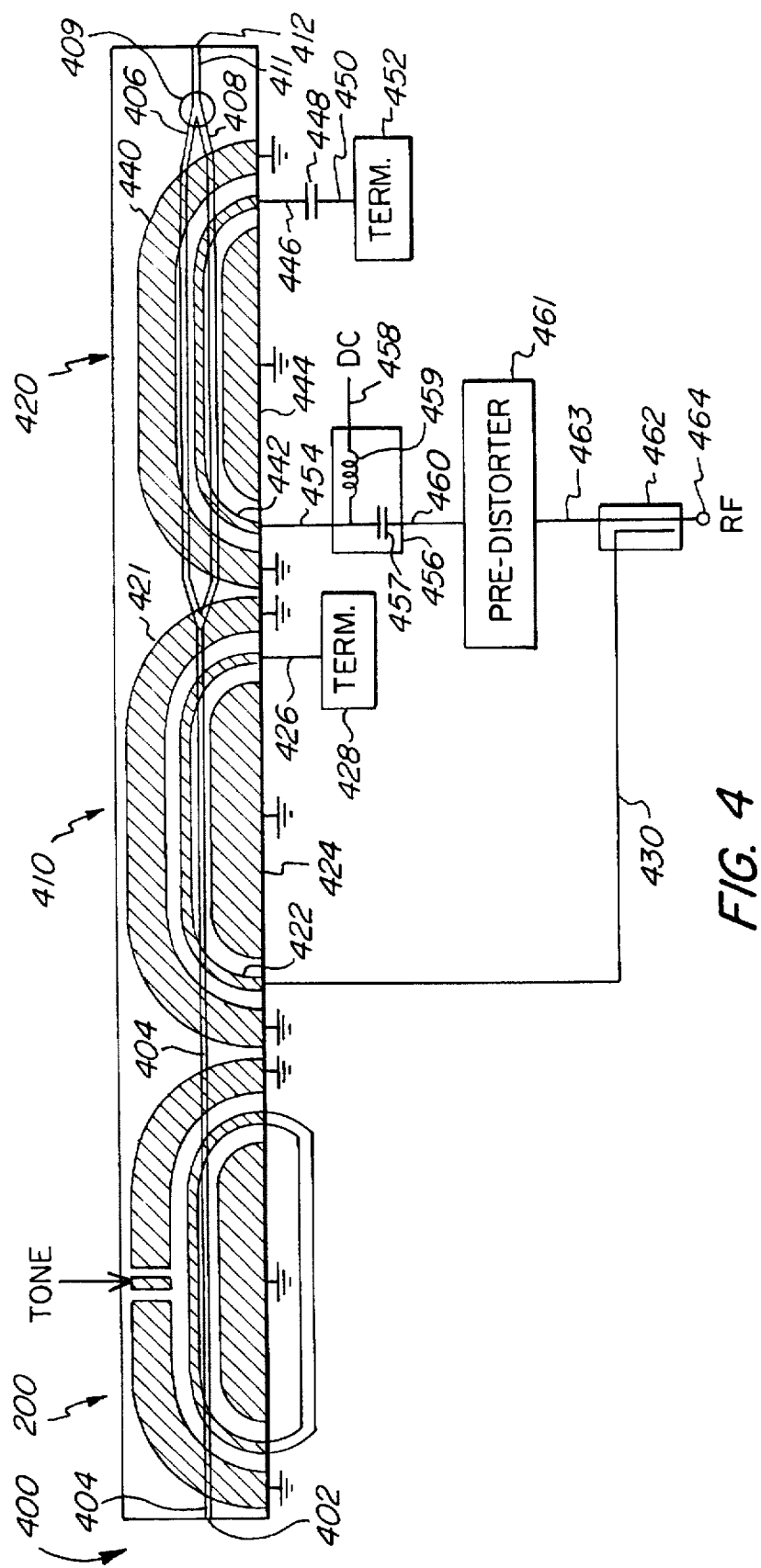
FIG. 4 shows a top view of an integrated modulation device in accordance with the present invention, including a resonantly enhanced modulator, a pre-chirping phase modulator, and an intensity modulator.

FIG. 4 shows an integrated modulation device 400 in accordance with the present invention, including a resonantly enhanced modulator 200, a pre-chirping phase modulator 410, and an intensity modulator 420. See FIG. 2 and the associated discussion for details of the modulator 200. The modulator 200 receives an RF tone input. An optical carrier is input to the device 400 via input port 402 and propagates in the waveguide 404. After traversing the modulator 200, the optical carrier enters the pre-chirping phase modulator 410.

The pre-chirping phase modulator 410 includes RF electrode 422 and ground electrodes 421 and 424. The RF electrode 422 receives and carries a RF intensity-modulation signal, such as an AM-VSB CATV signal. The RF intensity-modulation signal is provided via input terminal 464, splitter 462 and line 430 to a first end of the RF electrode 422. A second end of the RF electrode is coupled to a terminal impedance 428 via a line 426. The ground electrodes 421 and 424 act in conjunction with the RF electrode 422 to provide an electromagnetic field corresponding to the RF intensity-modulation signal to the optical carrier in the waveguide 404.

After traversing the pre-chirping phase modulator 410, the optical carrier in waveguide 404 is split into paths 406 and 408 and enters the intensity-modulator section 420 of the device 400. The intensity modulator 420 shown is a push-pull Mach-Zehnder modulator since the optical carrier in both of paths 406 and 408 are modulated. However, modulation of both paths is not required. The intensity modulator 420 includes a RF coupling electrode 442 with a first end and a second end. A portion of the RF coupling electrode is located between the first and second paths, 406 and 408, respectively. Furthermore, the intensity modulator 420 includes ground electrodes 440 and 444. The RF electrode 442 receives and carries the RF intensity-modulation signal provided to the pre-chirping phase modulator 410, but with pre-distortion. The RF intensity-modulation signal is provided via input terminal 464, splitter 462 and line 463 to pre-distorter 461, and then via line 460 to a bias-T circuit 456. The bias-T circuit 456 includes a capacitor 457 and an inductor 459.

The structure of the device illustrated in FIG. 4 is advantageous for analog CATV signal distribution because, for optically amplified long haul fiber optic links, some pre-chirping is useful to combat distortion due to fiber dispersion. In particular, the advent of commercially available rare earth fiber amplifiers, such as the Erbium-Doped Fiber Amplifier (EDFA), has led to the use of systems that transmit AM-VSB television signals at the optical wavelength of 1,550 nm, which is the wavelength at which EDFAs operate. However, most fiber links currently installed utilize fiber that has a minimum dispersion wavelength near 1,310 nm. Thus, in analog communication systems, transmission of a 1,550 nm signal in such a fiber link will result in fiber dispersion. The amplitude and phase of the RF signal input to the pre-chirping modulator 410 via line 430 can optionally be adjusted to provide a minimal dispersion penalty for a given link length.

A DC bias signal is also provided to the bias-T circuit 456 via line 458. A combined signal including the RF intensity-modulation signal and the DC bias signal is then coupled to a first end of the RF electrode 442 via line 454. A second end of the RF electrode 442 is coupled to a terminal impedance 452 via lines 446 and 450. A capacitor 448 provides an open circuit to the DC bias signal and a short circuit to the RF intensity-modulation signal.

The ground electrode 440 acts in conjunction with the RF electrode 442 to provide a first electromagnetic field corresponding to the RF intensity-modulation signal and the DC bias signal to the optical carrier in path 406. Similarly, the ground electrode 444 acts in conjunction with the RF electrode 442 to provide a second electromagnetic field corresponding to the RF intensity-modulation signal and the DC bias signal to the optical carrier in path 408. The optical signals from paths 406 and 408 are combined at coupler 409 and provided on path 411 to an output port 412 for transmission over an optical fiber (not shown).

Alternatively, instead of combining the optical signals at coupler 409, the optical signals in paths 406 and 408 may be provided to a balanced bridge modulator, (not shown) which has two independently addressable phase modulators such as modulator 410. In this manner, the optical signals can be phase modulated as required by the lengths of the respective fiber links.

In accordance with the present invention, by coupling a combined signal including the RF intensity-modulation signal and the DC bias signal to the RF electrode 442, there is no need for a separate DC bias electrode, such as element 30 in the conventional modulator of FIG. 1. Moreover, elimination of the DC bias electrode makes additional space available for the interferometric sections, thereby allowing further optimization of the drive power of the device.

Furthermore, both the pre-chirping phase modulator 410 and the intensity modulator 420 are driven by the same RF signal. For CATV applications where the conventional Mach-Zehnder modulator must be pre-distorted, this configuration advantageously eliminates the need for two separate pre-distorters, such as required in the structure described in U.S. Pat. No. 5,303,079 to Gnauck et al. Moreover, the approach is applicable to both optically and electronically linearized CATV modulators.

As can be seen, the present invention provides an external optical modulator that reduces drive current and is space-efficient. A resonantly enhanced modulator eliminates the need for a terminal resistance, and provides SBS suppression and depolarization. A pre-chirping phase modulator and associated intensity modulator provide a conditioned signal for long haul applications in accordance with a common RF/DC bias signal, while eliminating the need for a separate DC bias electrode. An integrated device comprising the resonantly enhanced modulator, the pre-chirping phase modulator, and the intensity modulator is particularly suited for transmission of CATV signals over long distance fiber optic links.

Although the invention has been described in connection with various specific embodiments, those skilled in the art will appreciate that numerous adaptations and modifications may be made thereto without departing from the spirit and scope of the invention as set forth in the claims.

I claim:

1. An external electro-optic modulator, comprising:
   a first electrode;
   means for coupling a radio-frequency (RF) signal to said first electrode;
   a ground electrode operatively associated with said first electrode for providing an electromagnetic field corresponding to said RF signal to an optical signal in a waveguide of said modulator; and
   electrically conductive ring resonator including a portion disposed within said electromagnetic field, wherein said ring resonator resonates in response to said electromagnetic field.

2. The modulator of claim 1, wherein at least part of said ring resonator is disposed within an active area of said modulator.

3. The modulator of claim 2, wherein a portion of said ring resonator is disposed outside said active area of said modulator.

4. The modulator of claim 3, wherein said portion of said ring resonator disposed outside said active area comprises coaxial cable.

5. The modulator of claim 4, wherein said coaxial cable comprises a central conducting portion and an outer ground portion, said outer ground portion being grounded to a ground plane of said modulator.

6. The modulator of claim 2, wherein a plurality of coaxial cables are provided in said portion of said ring resonator outside said active area.

7. The modulator of claim 1, wherein said RF signal is selected to broaden a linewidth of said optical signal.

8. An external electro-optic phase modulator for pre-chirping said linewidth-broadened optical signal of claim 7, comprising:
   a waveguide for receiving and carrying said linewidth-broadened optical signal;
   an RF electrode;
   means for coupling an RF intensity-modulation signal to said RF electrode; and
   a ground electrode operatively associated with said RF electrode for providing an electromagnetic field corresponding to said RF intensity-modulation signal to said linewidth-broadened optical signal in said waveguide of said phase modulator to pre-chirp said linewidth-broadened optical signal.

9. An external electro-optic intensity modulation apparatus for modulating the intensity of said pre-chirped linewidth-broadened optical signal of claim 8, comprising:
   a waveguide including a first path and a second path for receiving and carrying said pre-chirped linewidth-broadened optical signal;
   an RF coupling electrode including a first end and a second end, said RF coupling electrode having a portion disposed between said first and second paths;
   means for coupling a radio-frequency (RF) intensity-modulation signal and a direct current (DC) bias signal to said first end of said RF coupling electrode; and
   a first ground electrode operatively associated with said RF coupling electrode for providing a first electromagnetic field corresponding to said RF intensity-modulation signal and said (DC) bias signal to modulate said optical signal in said first path.

10. The apparatus of claim 9, further comprising:
    a second ground electrode operatively associated with said RF coupling electrode for providing a second electromagnetic field corresponding to said RF intensity-modulation signal and said (DC) bias signal to modulate said optical signal in said second path.

11. The apparatus of claim 9, wherein said means for coupling said radio-frequency (RF) intensity-modulation signal and said direct current (DC) bias signal to said first end of said RF coupling electrode comprises a bias-T circuit.

12. The apparatus of claim 9, further comprising:
    a terminal impedance coupled to said second end of said RF coupling electrode for providing an open circuit to said DC bias signal and a short circuit to said RF intensity-modulation signal.

13. An integrated electro-optic device including said intensity modulation apparatus of claim 9, wherein:

said linewidth-broadening modulator, said pre-chirping phase modulator, and said intensity modulation apparatus are disposed on a common substrate.

14. The pre-chirping phase modulator of claim 8, wherein said RF intensity-modulation signal corresponds to data to be transmitted by said linewidth-broadened optical signal in said waveguide of said pre-chirping phase modulator.

15. The modulator of claim 7, wherein said RF signal is selected to depolarize said optical signal.

16. The modulator of claim 1, wherein said RF signal is selected to depolarize said optical signal.

17. The modulator of claim 1, wherein said first electrode comprises a first portion and a second portion; and said RF coupling means is an electrode disposed between said first and second portions of said first electrode.

18. The modulator of claim 1, wherein said ring resonator is capacitively coupled to said RF coupling means.

19. The modulator of claim 1, wherein said ring resonator is inductively coupled to said RF coupling means.

* * * * *